(12) United States Patent
Lee et al.

(10) Patent No.: US 8,705,844 B2
(45) Date of Patent: Apr. 22, 2014

(54) IMAGE PROCESSING METHOD AND APPARATUS THEREFOR

(75) Inventors: Dae-jong Lee, Suwon-si (KR);
Sung-wook Park, Seoul (KR);
Hyun-kwon Chung, Seoul (KR);
Kil-soo Jung, Osan-si (KR); Hye-young Jun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1186 days.

(21) Appl. No.: 12/563,310

(22) Filed: Sep. 21, 2009

(65) Prior Publication Data

US 2010/0166338 A1 Jul. 1, 2010

(30) Foreign Application Priority Data

Dec. 26, 2008 (KR) ........................ 10-2008-0134954

(51) Int. Cl.
*G06K 9/00* (2006.01)

(52) U.S. Cl.
USPC ........... 382/154; 382/181; 345/204; 345/419; 348/43; 348/51

(58) Field of Classification Search
USPC ................ 382/154; 345/419, 204; 348/43, 51
See application file for complete search history.

(56) References Cited

U.S. PATENT DOCUMENTS

| | | | | |
|---|---|---|---|---|
| 5,572,258 A | * | 11/1996 | Yokoyama | 348/415.1 |
| 6,445,815 B1 | * | 9/2002 | Sato | 382/154 |
| 7,565,003 B2 | * | 7/2009 | Ashizaki et al. | 382/154 |
| 8,106,896 B2 | * | 1/2012 | Hwang | 345/204 |
| 8,134,745 B2 | * | 3/2012 | Hasegawa | 358/1.9 |
| 2004/0135780 A1 | * | 7/2004 | Nims | 345/419 |
| 2004/0151376 A1 | * | 8/2004 | Nomura et al. | 382/181 |
| 2005/0259147 A1 | | 11/2005 | Nam et al. | |

(Continued)

FOREIGN PATENT DOCUMENTS

| | | |
|---|---|---|
| CN | 101276060 A | 10/2008 |
| KR | 10-2005-0026959 | 3/2005 |

(Continued)

OTHER PUBLICATIONS

PCT International Application issued on Jul. 22, 2010, in corresponding European Application No. PCT/KR2009/007387 (9 pages).
Chinese Office Action issued Aug. 27, 2013 in counterpart Chinese Application No. 200980152915.1 (16 pages, in Chinese, with complete English translation).

*Primary Examiner* — Vu Le
*Assistant Examiner* — Aklilu Woldemariam
(74) *Attorney, Agent, or Firm* — NSIP Law (57) ABSTRACT

An image processing method, including extracting compensation information comprising one from among a depth compensation value and a depth value compensated for by using the depth compensation value; when the compensation information comprises the depth compensation value, compensating for a depth value to be applied to a pixel of a two-dimensional (2D) image by using the depth compensation value, and generating a depth map about the 2D image by using the compensated depth value, and when the compensation information comprises the compensated depth value, generating the depth map about the 2D image by using the compensated depth value; obtaining positions in a left-eye image and a right-eye image by using the depth map, wherein the pixel of the 2D image is mapped to the positions; and generating the left-eye image and the right-eye image comprising the positions to which the pixel is mapped.

36 Claims, 5 Drawing Sheets

(56) References Cited

U.S. PATENT DOCUMENTS

| | | |
|---|---|---|
| 2005/0265442 A1* | 12/2005 | Kim ............................ 375/240.1 |
| 2007/0024604 A1* | 2/2007 | Jang et al. ...................... 345/204 |
| 2007/0120972 A1 | 5/2007 | Kim et al. |
| 2007/0176914 A1 | 8/2007 | Bae et al. |
| 2008/0240549 A1 | 10/2008 | Koo et al. |
| 2008/0291302 A1* | 11/2008 | Noh .............................. 348/251 |

FOREIGN PATENT DOCUMENTS

| | | |
|---|---|---|
| KR | 10-2005-0078328 | 8/2005 |
| KR | 10-2007-0055882 | 5/2007 |
| KR | 10-2007-0078464 | 8/2007 |

* cited by examiner

COMPENSATED LEFT-EYE IMAGE

COMPENSATED RIGHT-EYE IMAGE

FIG. 2B

LEFT-EYE IMAGE

RIGHT-EYE IMAGE

FIG. 2A

TWO-DIMENSIONAL IMAGE

DEPTH MAP

COMPENSATION INFORMATION DATA FILE

Source Info Type="Frame#", Value Type="Percentance"

a  Source ID="1", Value="60"
b  Source ID="100", Value="90"
c  Source ID="1001", Value="80"

FIG. 4

IMAGE PROCESSING METHOD AND APPARATUS THEREFOR

CROSS-REFERENCE TO RELATED APPLICATION

This application claims the benefit of Korean Patent Application No. 10-2008-0134954, filed in the Korean Intellectual Property Office on Dec. 26, 2008, the disclosure of which is incorporated herein by reference.

BACKGROUND OF THE INVENTION

1. Field of the Invention

Aspects of the present invention relate to an image processing method and apparatus therefor, and more particularly, to an image processing method and apparatus therefor, which can adjust a depth of a three-dimensional (3D) image according to user selection and can store the depth of the 3D image when the three-dimensional image is generated by using a two-dimensional (2D) image.

2. Description of the Related Art

Due to development of digital technologies, 3D image technology has become more widespread. 3D image technology is aimed at realizing a realistic image by applying information about depth to a 2D image.

Since human eyes are separated in a horizontal direction by a predetermined distance, 2D images respectively viewed by a left eye and a right eye are different from each other such that a binocular disparity occurs. The human brain combines the different 2D images, and thus generates a 3D image having the appearance of perspective and reality.

3D image technology is classified into an image generating technique for generating video data as a 3D image from the start, and an image converting technique for converting 2D video data into a 3D image. In this regard, research is being conducted to study these two techniques together.

SUMMARY OF THE INVENTION

Aspects of the present invention provide an image processing method and apparatus therefor, which can adjust a depth of a three-dimensional (3D) image according to user selection, can store information about the user selection or about the adjusted depth, and can use the information at a later time.

According to an aspect of the present invention, an image processing method is provided. The method includes extracting compensation information including a depth compensation value or a depth value compensated for based on the depth compensation value; when the compensation information includes the depth compensation value, compensating for a depth value to be applied to a pixel of a two-dimensional (2D) image based on the depth compensation value, and generating a depth map about the 2D image based on the compensated depth value, and when the compensation information includes the compensated depth value, generating the depth map about the 2D image based on the compensated depth value; obtaining positions in a left-eye image and a right-eye image based on the depth map, wherein the pixel of the 2D image is mapped to the positions; and generating the left-eye image and the right-eye image in which the pixels are mapped to the obtained positions.

According to another aspect of the present invention, the compensation information may include image identification information identifying the 2D image. The compensation information may include compensation value identification information indicating whether the compensation information comprises the depth compensation value or the depth value compensated for based on the depth compensation value.

According to another aspect of the present invention, the compensation information may include title identification information identifying a title comprising the 2D image, disc identification information identifying a disc having the title recorded thereon, and/or user identification information for determining which of a plurality of users is related to the compensation information when compensation information is stored with respect to the plurality of users. The compensation information may include depth compensation values and depth values compensated for based on the depth compensation values which are respectively for a plurality of objects and backgrounds included in the 2D image.

According to another aspect of the present invention, the compensating for the depth value to be applied to the pixel of a 2D image based on the depth compensation value may include increasing or decreasing depth values of pixels of the 2D image according to a same percentage value. The depth value to be applied to the pixel of the 2D image may be in a range between N and M, where N<M and N and M are integers, and compensating for the depth value to be applied to the pixel of the 2D image based on the depth compensation value may include increasing the value of N and/or decreasing the value of M, thereby allowing the pixels of the 2D image to respectively have a depth value from among depth values in the adjusted range.

According to another aspect of the present invention, an image processing method is provided. The method includes extracting compensation information including a position compensation value or a position value compensated for based on the position compensation value; and when the compensation information includes the position compensation value, compensating for positions in a left-eye image and a right-eye image based on the position compensation value, wherein the positions are obtained by using a depth map about a 2D image and wherein a pixel of the 2D image is mapped to the positions, and generating the left-eye image and the right-eye image including the compensated positions to which the pixel is mapped, and when the compensation information includes the compensated position value, mapping the pixel to positions in a left-eye image and a right-eye image so as to generate the left-eye image and the right-eye image, wherein the positions are obtained based on the compensated position value and wherein the pixel of the 2D image is mapped to the positions.

According to another aspect of the present invention, an image processing method is provided. The method includes the operations of compensating for a depth value to be applied to a pixel of a 2D image based on a depth compensation value received from a user; generating a depth map about the 2D image based on the compensated depth value, and obtaining positions in a left-eye image and a right-eye image based on the depth map, wherein the pixel of the 2D image is mapped to the positions; generating the left-eye image and the right-eye image including the positions to which the pixel is mapped; and generating compensation information including the depth compensation value and/or the compensated depth value, and storing the compensation information.

According to another aspect of the present invention, an image processing method is provided. The method includes obtaining positions in a left-eye image and a right-eye image based on a depth value to be applied to a pixel of a 2D image, wherein the pixel is mapped to the positions; adjusting the positions according to a position compensation value received from a user; generating the left-eye image and the right-eye image including the adjusted positions to which the pixel is mapped; and generating compensation information including the position compensation value and/or the adjusted positions, and storing the compensation information.

According to another aspect of the present invention, an image processing apparatus is provided. The apparatus includes a compensation information processing unit to extract compensation information including a depth compensation value or a depth value compensated for based on the depth compensation value; a depth map generating unit to compensate for a depth value to be applied to a pixel of a 2D image by using the depth compensation value when the compensation information includes the depth compensation value, and to generate a depth map about the 2D image based on the compensated depth value, and to generate the depth map about the 2D image based on the compensated depth value when the compensation information includes the compensated depth value; and a 3D image generating unit to obtain positions in a left-eye image and a right-eye image based on the depth map, wherein the pixel of the 2D image is mapped to the positions, and to generate the left-eye image and the right-eye image including the positions to which the pixel is mapped.

According to another aspect of the present invention, an image processing apparatus is provided. The apparatus includes a compensation information processing unit to extract compensation information including a position compensation value or a position value compensated for based on the position compensation value; and a 3D image generating unit to compensate for positions in a left-eye image and a right-eye image by using the position compensation value when the compensation information includes the position compensation value, wherein the positions are obtained by using a depth map about a 2D image and wherein a pixel of the 2D image is mapped to the positions, and to generate the left-eye image and the right-eye image including the compensated positions to which the pixel is mapped, and to generate a left-eye image and a right-eye image by mapping the pixel to positions in the left-eye image and the right-eye image when the compensation information includes the compensated position value, wherein the positions are obtained based on the compensated position value and wherein the pixel of the 2D image is mapped to the positions.

According to another aspect of the present invention, an image processing apparatus is provided. The apparatus includes a user interface to receive a depth compensation value from a user; a depth map generating unit to compensate for a depth value to be applied to a pixel of a 2D image based on the depth compensation value, and to generate a depth map about the 2D image based on the compensated depth value; a 3D image generating unit to obtain positions in a left-eye image and a right-eye image based on the depth map and to map the pixel of the 2D image to the positions, and to generate the left-eye image and the right-eye image including the positions to which the pixel is mapped; and a compensation information processing unit to generate compensation information including the depth compensation value and/or the compensated depth value, and to store the compensation information in a local storage unit.

According to another aspect of the present invention, an image processing apparatus is provided. The apparatus includes a user interface to receive a position compensation value from a user; a 3D image generating unit to obtain positions in a left-eye image and a right-eye image based on a depth value to be applied to a pixel of a 2D image, to map the pixel to the positions, to adjust the positions according to the position compensation value, and to generate the left-eye image and the right-eye image including the adjusted positions to which the pixel is mapped; and a compensation information processing unit to generate compensation information including the position compensation value and/or the adjusted positions, and to store the compensation information.

According to another aspect of the present invention, a computer readable information storing medium is provided, having stored thereon a program to execute an image processing method. The method includes extracting compensation information including a depth compensation value or a depth value compensated for based on the depth compensation value; when the compensation information includes the depth compensation value, compensating for a depth value to be applied to a pixel of a 2D image based on the depth compensation value, and generating a depth map about the 2D image based on the compensated depth value; when the compensation information includes the compensated depth value, generating the depth map about the 2D image based on the compensated depth value; obtaining positions in a left-eye image and a right-eye image based on the depth map and mapping the pixel of the 2D image to the positions; and generating the left-eye image and the right-eye image including the positions to which the pixel is mapped.

According to another aspect of the present invention, a computer readable information storing medium is provided, having stored thereon a program to execute an image processing method. The method includes extracting compensation information including a position compensation value or a position value compensated for based on the position compensation value; and when the compensation information includes the position compensation value, compensating for positions in a left-eye image and a right-eye image based on the position compensation value, wherein the positions are obtained based on a depth map about a 2D image and wherein a pixel of the 2D image is mapped to the positions, and generating the left-eye image and the right-eye image including the compensated positions to which the pixel is mapped, and when the compensation information includes the compensated position value, mapping the pixel to positions in the left-eye image and the right-eye image so as to generate the left-eye image and the right-eye image, wherein the positions are obtained based on the compensated position value and wherein the pixel of the 2D image is mapped to the positions.

According to another aspect of the present invention, a computer readable information storing medium is provided, having stored thereon a program to execute an image processing method. The method includes compensating for a depth value to be applied to a pixel of a 2D image based on a depth compensation value received from a user; generating a depth map about the 2D image based on the compensated depth value, obtaining positions in a left-eye image and a right-eye image based on the depth map, and mapping the pixel of the 2D image to the positions; generating the left-eye image and the right-eye image including the positions to which the pixel is mapped; and generating compensation information including the depth compensation value and/or the compensated depth value, and storing the compensation information.

According to another aspect of the present invention, a computer readable information storing medium is provided, having stored thereon a program to execute an image processing method including obtaining positions in a left-eye image and a right-eye image based on a depth value to be applied to a pixel of a 2D image and mapping the pixel to the positions; adjusting the positions according to a position compensation value received from a user; generating the left-eye image and the right-eye image including the adjusted positions to which the pixel is mapped; and generating compensation information including the position compensation value and/or the adjusted positions, and storing the compensation information.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
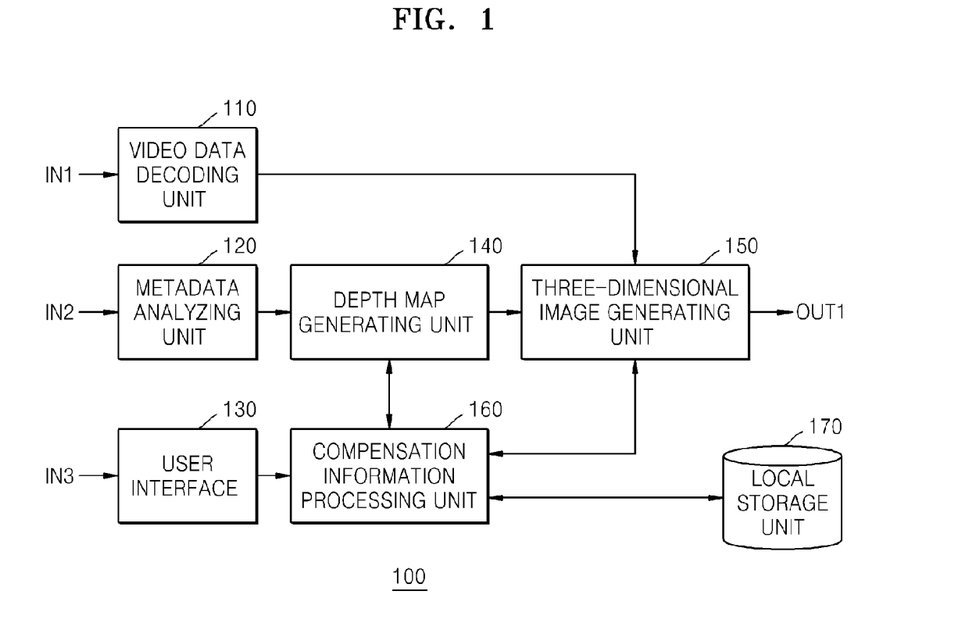
FIG. 1 illustrates an image processing apparatus according to an embodiment of the present invention.

FIG. 1 is a block diagram of an image processing apparatus 100 according to an embodiment of the present invention. The image processing apparatus 100 includes a video data decoding unit 110, a metadata analyzing unit 120, a user interface 130, a depth map generating unit 140, a three-dimensional (3D) image generating unit 150, a compensation information processing unit 160, and a local storage unit 170. According to other aspects of the present invention, the image processing apparatus 100 may include additional and/or different units. Similarly, the functionality of two or more of the above units may be integrated into a single component.

Video data and/or metadata about the video data may be recorded onto a disc or in the local storage unit 170 in a multiplexed or independent manner, or may be stored in an external server.

When the video data and/or metadata about the video data are stored in the external server, the image processing apparatus 100 may download the video data and/or metadata about the video data from the external server. For this purpose, the image processing apparatus 100 may further include a communicating unit (not shown) to perform wired or wireless communication with the external server. The external server may be operated by a content provider, such as a broadcasting station or a general content manufacturing company. When a user requests content, the external server storing the video data and/or metadata about the video data extracts and provides the requested content to the user.

The video data decoding unit 110 reads and decodes the video data. The video data decoding unit 110 transmits the decoded video data to the 3D image generating unit 150.

The metadata analyzing unit 120 reads and analyzes the metadata. The metadata includes additional information enabling the video data based on two-dimensional (2D) images to be output as 3D images. Since the video data is comprised of frames (i.e., a plurality of 2D images), the metadata includes additional information about the frames. In order to identify the video data about which the metadata refers, the metadata includes information identifying the video data. When the video data is recorded onto a disc, the information identifying the video data includes a disc identifier identifying the disc having the video data recorded thereon, and a title identifier indicating a title including the video data in the disc that is identified by the disc identifier. The metadata may be recorded in a lead-in area, a user data area, and/or a lead-out area of the disc.

A frame, that is, a 2D image, includes an image about a background and an image of an object not part of the background. The object indicates a person, a building, or the like, which has a vertical component.

The metadata analyzing unit 120 analyzes the metadata, thereby extracting background depth information for the generation of a depth map about the background (hereinafter, referred to as a 'background depth map'), and extracting object depth information for the generation of a depth map about the object (hereinafter, referred to as 'object depth map'). The metadata analyzing unit 120 transmits the background depth information and the object depth information to the depth map generating unit 140.

The depth map generating unit 140 generates a depth map about the 2D image based on the metadata analyzed by the metadata analyzing unit 120. The image processing apparatus 100 uses the depth map to give depth to the 2D image frame. A depth value refers to a degree of depth of predetermined pixels in an image. The degree of the depth of the image varies in a direction parallel with a direction in which the image is output. In this regard, when a depth value approaches 0, since the depth value becomes lower, a pixel having the depth value is recognized to be distant from a viewer. On the other hand, when a depth value becomes higher, a pixel having the depth value is recognized to be close to the viewer. Pixels of the 2D image may have different depth values.

The depth map generating unit 140 generates the background depth map based on the background depth information. The generation of the background depth map indicates that depth is given to each pixel of an image included in the background so as to give depth to the image including the background of the 2D image.

The depth map generating unit 140 generates the object depth map based on the object depth information. The generation of the object depth map indicates that depth is given to pixels of an image including the object so as to give depth to the object of the 2D image. If a plurality of objects exist, the depth map generating unit 140 generates depth maps for each of the plurality of objects, and combines the depth maps, thereby generating a depth map about the plurality of objects. The depth map generating unit 140 combines the background depth map and the object depth map, thereby generating a depth map about the 2D image. The depth map generating unit 140 transmits the generated depth map to the 3D image generating unit 150.

The 3D image generating unit 150 generates two images, a left-eye image and a right-eye image with respect to the 2D image, based on the decoded video data received from the video data decoding unit 110 and the depth map received from the depth map generating unit 140. The 3D image generating unit 150 may detect depth values for all pixels of the 2D image based on the depth map about the 2D image. The 3D image generating unit 150 generates the left-eye image and the right-eye image in such a manner that a pixel at a predetermined position in the 2D image may be mapped to be at positions that are a predetermined distance from the predetermined position in left and right directions. The positions in the left-eye image and the right-eye image, to which the pixel of the 2D image is mapped, vary according to a depth value to be applied to the pixel. When the depth of the pixel of the 2D image increases, in other words, when a depth value of the pixel approaches 0, the pixel is mapped to the positions in the left-eye image and the right-eye image, wherein the positions are distant from the predetermined position in the 2D image in horizontal left and right directions.

The user interface 130 manages the interface between a user and the image processing apparatus 100, thereby delivering a command from the user to the compensation information processing unit 160. The user may input a depth compensation value or a position compensation value to the image processing apparatus 100 via the user interface 130, and may request generation of compensation information. After the compensation information is generated and stored in the local storage unit 170, the user using the user interface 130 may select whether video data is to be reproduced with a depth compensated for based on the compensation information or may re-compensate for the compensation information. The user interface 130 includes, for example, a remote controller, or a keypad installed in the image processing apparatus 100.

The compensation information processing unit 160 generates the compensation information based on the depth compensation value or the position compensation value input from the user via the user interface 130. The depth compensation value indicates a value for adjusting depth values to be applied to the pixels of the 2D image. The position compensation value indicates a value for adjusting the positions in the left-eye image and the right-eye image, wherein the pixel at the predetermined position in the 2D image is to be mapped to the positions when the left-eye image and the right-eye image are generated based on the 2D image.

When the compensation information processing unit 160 receives the depth compensation value from the user, the compensation information processing unit 160 informs the depth map generating unit 140 of the depth compensation value. The depth map generating unit 140 generates the depth map about the 2D image based on the metadata, and adjusts the depth values of the depth map based on the depth compensation value received from the compensation information processing unit 160. In order to adjust the depth values of the depth map, the depth map generating unit 140 may increase or decrease the depth values of the pixels of the 2D image according to an equal rate. For example, where a range of a depth value is between 0 through 255, all depth values may be decreased by 50% so that the depth value may be between 0 through 127. In this case, since the depth values of all pixels of the 2D image are decreased by 50% compared to their original values, a depth is doubled. The depth map generating unit 140 may also adjust the range of the depth value to be between 100 through 200. In this case, a difference between the depth values of the pixels is decreased from a maximum of 255 to 100 so that a difference in depth between the pixels of the 2D image is decreased.

The compensation information processing unit 160 generates the compensation information including the depth compensation value input from the user or the depth value compensated for according to the depth compensation value, and stores the compensation information along with information identifying the 2D image in the local storage unit 170. With reference to the aforementioned example, the compensation information processing unit 160 may generate and store compensation information including the depth compensation value for decreasing the depth values by 50%, or may generate and store compensation information including depth values compensated for according to the depth compensation value, that is, the depth values of the pixels having the range between 0 through 127.

When the compensation information processing unit 160 receives the position compensation value from the user, the compensation information processing unit 160 transmits the position compensation value to the 3D image generating unit 150. The 3D image generating unit 150 generates the left-eye image and the right-eye image based on the depth map about the 2D image received from the depth map generating unit 140 in such a manner that the pixels of the 2D image are respectively mapped to positions that are horizontally distant from their original positions by each of predetermined distances. When the 3D image generating unit 150 receives the position compensation value from the compensation information processing unit 160, the 3D image generating unit 150 adjusts positions, to which predetermined pixels are mapped in the left-eye image and the right-eye image, based on the position compensation value. A method of adjusting the positions to which the predetermined pixel is mapped in the left-eye image and the right-eye image based on the position compensation value, will be described below in relation to FIG. 2.

The compensation information processing unit 160 generates the compensation information including the position compensation value input from the user or the position value compensated for according to the position compensation value, and stores the compensation information along with information for identifying the 2D image in the local storage unit 170.

The local storage unit 170 stores information downloaded from the external server. The local storage unit 170 may also store compensation information including the depth compensation value or the position compensation value input from the user via the user interface 130, or store compensation information including the depth value, which is compensated for by the depth map generating unit 140 based on the depth compensation value, or the position value which is compensated for by the 3D image generating unit 150 based on the position compensation value.

After generating the left-eye image and the right-eye image, the 3D image generating unit 150 generates an image of a 3D format including the left-eye image and the right-eye image as one frame. Types of the 3D format include a top-down format, a side by side format, an interlaced format, etc.

The 3D image generating unit 150 outputs the image of the 3D format to an output device (not shown). The output device may be included in the image processing apparatus 100. The output device sequentially outputs the left-eye image and the right-eye image to a screen. With respect to one eye, when images are output at a frame rate of a minimum of 60 Hz, a viewer recognizes that the images are sequentially reproduced without any image stutter. Therefore, in order to allow images input via left/right eyes to be combined and then recognized as a 3D image by the viewer, the output device should output the images at a frame rate of at least 120 Hz. The output device sequentially displays the left-eye image and the right-eye image which are included in the frame by a unit of $1/120$ sec. By doing so, the left-eye image and the right-eye image are respectively received by the left eye and the right eye of the viewer, the viewer's brain combines the left-eye image and the right-eye image, and thus recognizes the 3D image.

In addition, unlike FIG. 1, in which the compensation information processing unit 160 is included in the image processing apparatus 100 as hardware, functions performed by the compensation information processing unit 160 may be implemented as software via a Blu-ray Disc (BD) Java application recorded onto a disc. In the case where the image processing apparatus 100 uses the BD Java application, when an image is first reproduced, the BD Java application checks whether the compensation information is stored in the local storage unit 170, and reads the compensation information.

When a user inputs a compensation value, the BD Java application delivers information input by the user to the depth map generating unit 140 or to the 3D image generating unit 150. The BD Java application may generate and store compensation information in the local storage unit 170.

Figure 2A:
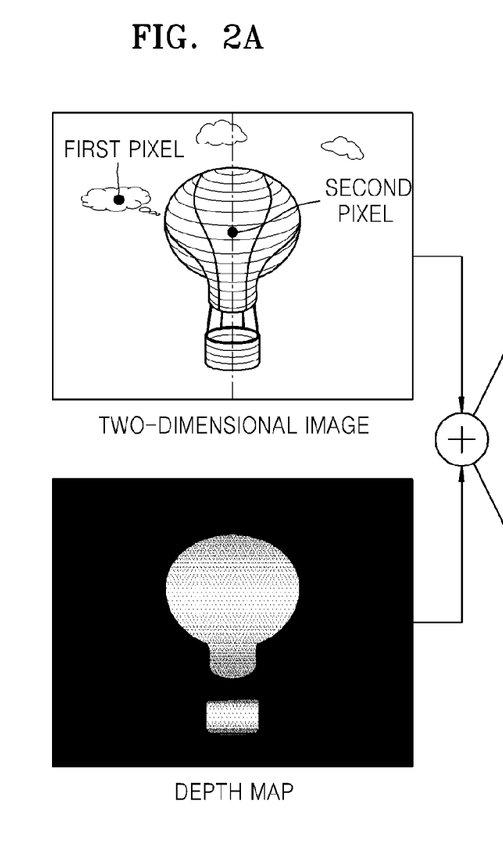
FIGS. 2A-2C illustrate a method of adjusting positions, to which a predetermined pixel is mapped in a left-eye image and a right-eye image, based on a position compensation value, according to an embodiment of the present invention.

FIG. 2 illustrates a method of adjusting positions, to which a predetermined pixel is mapped in a left-eye image and a right-eye image, based on a position compensation value, according to an embodiment of the present invention. Referring to FIG. 2A, original positions of a first pixel and a second pixel are marked in a 2D image. The 3D image generating unit 150 generates a left-eye image and a right-eye image where the first and second pixels of the 2D image are mapped to positions that are a predetermined distance from their original positions of the 2D image based on a depth map received from the depth map generating unit 140.

Figure 2B:
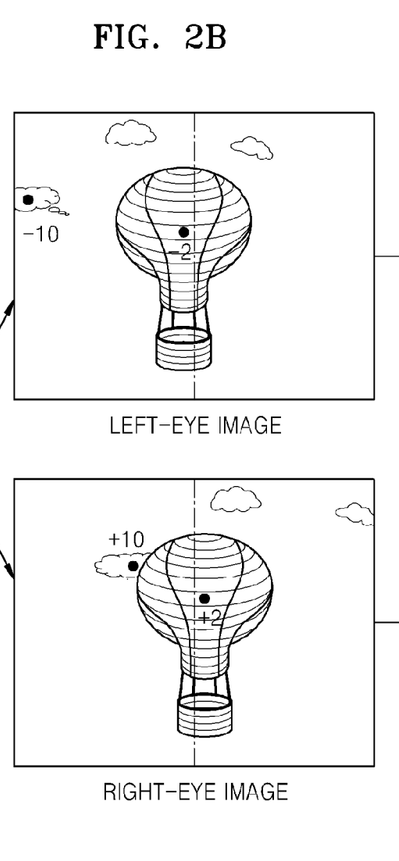

FIG. 2B illustrates the left-eye image and the right-eye image, which are generated by the 3D image generating unit 150. The 3D image generating unit 150 generates the left-eye image and the right-eye image in such a manner that the first pixel of the 2D image is mapped to a position that is horizontally distant from the original position by 10 pixels in both left and right directions, and the second pixel of the 2D image is mapped to a position that is horizontally distant from the original position by 2 pixels in both left and right directions. In the case where the 3D image generating unit 150 receives a position compensation value from the compensation information processing unit 160, the 3D image generating unit 150 adjusts positions based on the position compensation value, wherein a predetermined pixel is mapped to the positions in a left-eye image and a right-eye image.

Figure 2C:
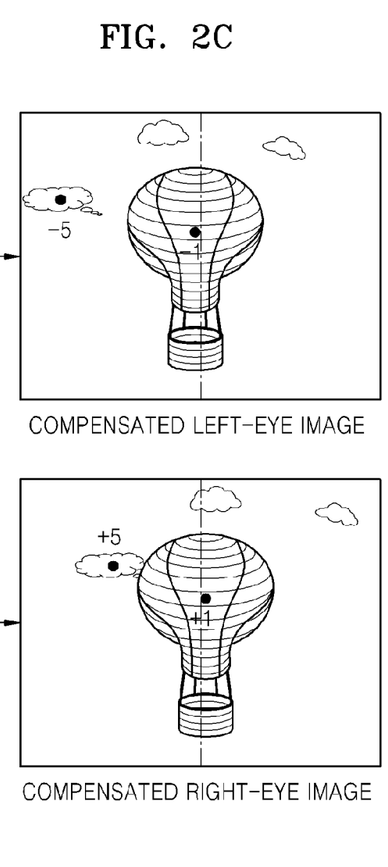

FIG. 2C illustrates a left-eye image and a right-eye image, in which a position movement value is compensated for by the 3D image generating unit 150 based on the position movement value received from a user. When a position compensation value requiring that a movement distance be decreased by 50% is received from a user via the compensation information processing unit 160, the 3D image generating unit 150 adjusts the position movement value in such a manner that the first pixel is mapped to a position that is distant from the original position in the 2D image by 5 pixels, instead of 10 pixels, in both left and right directions, and the second pixel is mapped to a position that is distant from the original position in the 2D image by 1 pixel, not 2 pixels, in both left and right directions. In this case, depths with respect to the first pixel and the second pixel are decreased by 50%, compared to their original depths. Thus, when the user views a 3D image, the user may adjust for dizziness or discomfort due to depth with respect to each pixel of the 3D image.

The compensation information processing unit 160 generates compensation information including the position compensation value or the position value compensated for based on the position compensation value, and stores the compensation information in the local storage unit 170. Referring to FIG. 2, the compensation information processing unit 160 may store the position compensation value requiring that the position movement value be decreased by 50%, or may store compensated position values indicating that the first pixel and the second pixel are respectively moved to the positions distant from their original positions by +5/−5 pixels and +1/−1 pixels according to the position movement value.

In this manner, the image processing apparatus 100 according to the embodiment of FIG. 1 may generate and store the compensation information so that, when a 2D image is reproduced at a later time, a user may allow left and right position movement values of a pixel to be adjusted in a left-eye image and a right-eye image based on the stored compensation information without having to re-input the position values again, wherein the left-eye image and the right-eye image are generated from the 2D image.

Figure 3A:
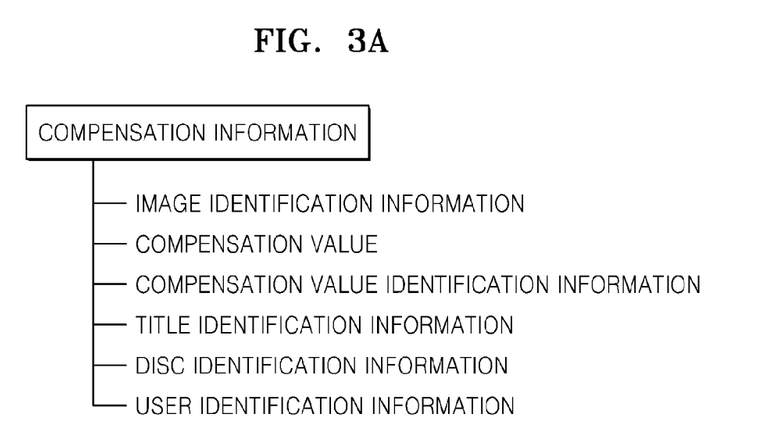
FIGS. 3A-3C illustrate compensation information generated by the image processing apparatus of FIG. 1, according to an embodiment of the present invention.

FIG. 3 illustrates compensation information generated by the image processing apparatus 100 of FIG. 1, according to an embodiment of the present invention. Referring to FIG. 3A, the compensation information includes image identification information to identify a 2D image to which the compensation information will be applied. The image identification information may include a frame number, a time at which an image is reproduced, other information capable of identifying the image, and the like.

The compensation information includes a compensation value with respect to the identified image. The compensation value may be a position compensation value or a depth compensation value. The compensation information may further include compensation value identification information indicating whether the compensation value corresponds to the depth compensation value, a depth value compensated for by the depth compensation value, the position compensation value, or a position value compensated for by the position compensation value and indicating whether the compensation value includes a fixed value or a percentage value. The compensation information may further include title identification information identifying a title including the 2D image and disc identification information identifying a disc having the title recorded thereon.

The compensation information may be stored for each user. In this case, the compensation information may further include user identification information indicating which user corresponds to current compensation information.

Figure 3B:
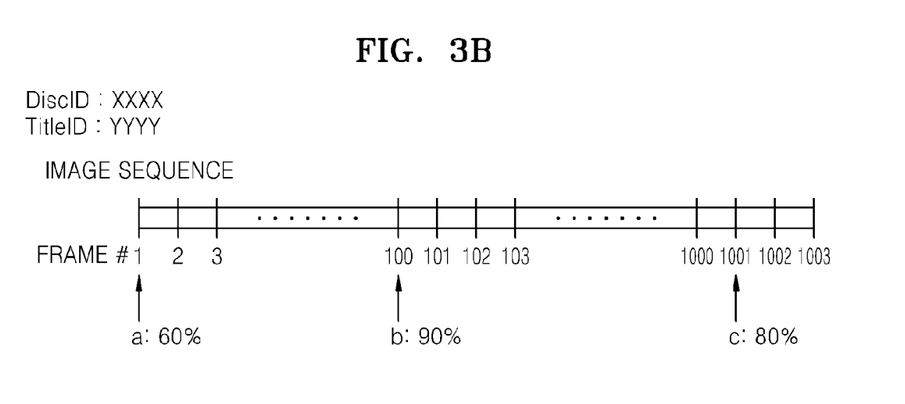

FIGS. 3A and 3B illustrate the generation of the compensation information according to user instruction. When an image sequence is reproduced, a user inputs the depth compensation value or the position compensation value via the user interface 130. Referring to FIG. 3B, if the user inputs a compensation value, when a predetermined frame is reproduced, the compensation information processing unit 160 may store therein the image identification information including one from among a predetermined frame number, a time at which the predetermined frame is reproduced, and other information capable of identifying the predetermined frame.

Figure 3C:
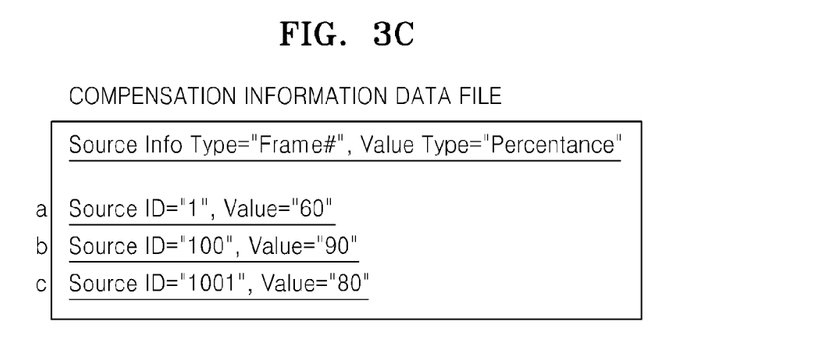

FIG. 3C corresponds to the compensation information generated by the compensation information processing unit 160. Referring to FIG. 3C, it is possible to see that a "frame #" is used as the image identification information, and the compensation value is indicated as a "percent value".

When a first frame is reproduced and a user inputs a position compensation value of 60%, the compensation information processing unit 160 generates compensation information including a frame number 1 and a position compensation value of 60%. When a $100^{th}$ frame is reproduced and the user inputs a position compensation value of 90%, the compensation information processing unit 160 includes a frame number 100 and a position compensation value of 90% in the compensation information. When a 1001$^{st}$ frame is reproduced and the user inputs a position compensation value of 80%, the compensation information processing unit 160 includes a frame number 1001 and a position compensation value of 80% in the compensation information.

The compensation information processing unit 160 generates the compensation information as soon as the user inputs the compensation value, and stores the compensation information in the local storage unit 170.

Figure 4:
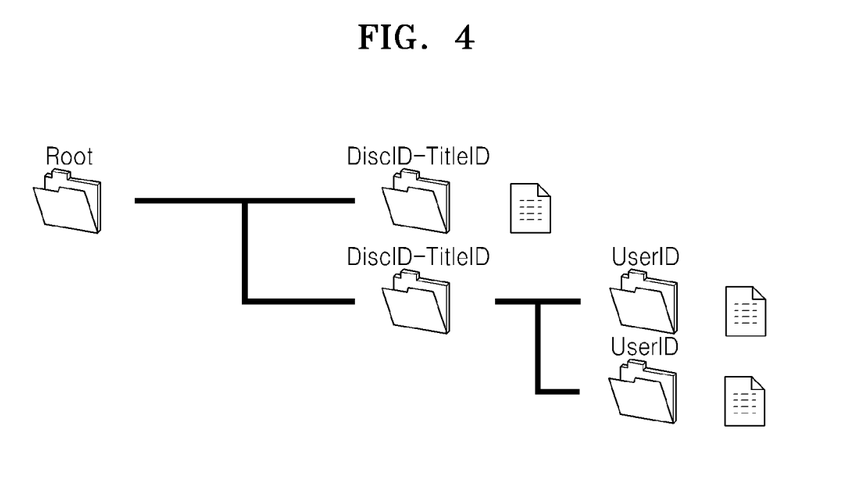
FIG. 4 illustrates a directory structure of a local storage unit when the local storage unit contains compensation information according to an embodiment of the present invention.

FIG. 4 is a diagram of a directory structure of the local storage unit 170 according to an embodiment of the present invention when the local storage unit 170 contains compensation information. A ROOT directory may exist at an uppermost level in an area storing the compensation information, and different sub-directories may be generated for each of disc identification information and title identification information. Where the compensation information is generated for each user, sub-directories may be generated according to user identification information so that a compensation information data file may be stored in each of the sub-directories for each user.

As illustrated in FIG. 4, the compensation information may be stored in each directory. However, unlike the directory structure of FIG. 4, the compensation information may be stored in the local storage unit 170 as a file whose name is distinguishable from other file names and indicates a disc and a title.

The compensation information processing unit 160 generates the compensation information as soon as a user inputs a compensation value, and stores the compensation information in the local storage unit 170. When the user attempts to use the compensation information at a later time, the compensation information processing unit 160 searches for and extracts user desired compensation information, thereby transmitting the user desired compensation information to the depth map generating unit 140 or the 3D image generating unit 150. When the user wants to re-compensate for compensation information previously stored in the local storage unit 170, the compensation information processing unit 160 re-compensates for the compensation information according to a user instruction, and re-stores the compensation information again in the local storage unit 170.

Figure 5:
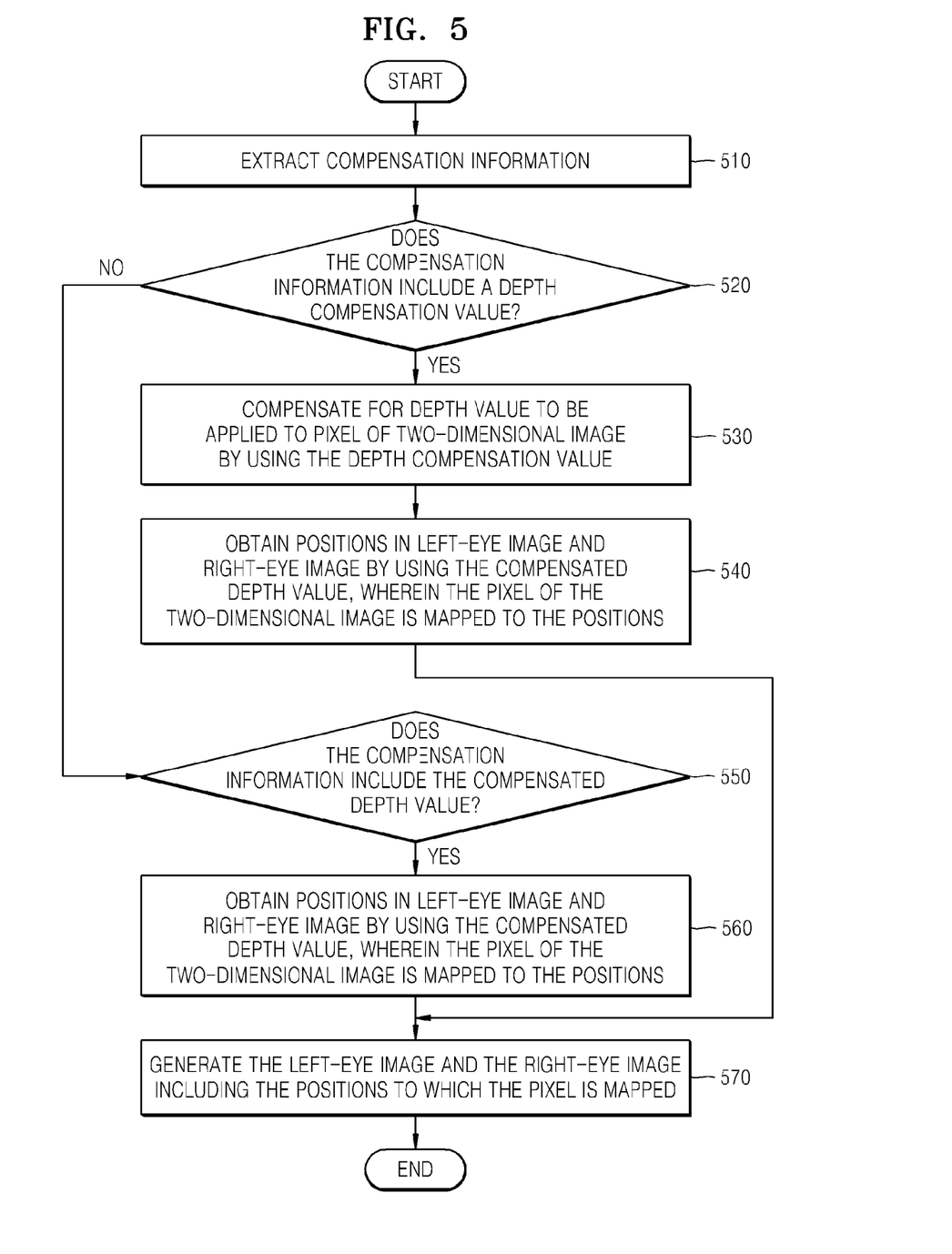
FIG. 5 is a flowchart of an image processing method, according to an embodiment of the present invention.

FIG. 5 is a flowchart of an image processing method, according to an embodiment of the present invention. When the image processing apparatus 100 reproduces a 2D image as a 3D image, the compensation information processing unit 160 determines whether compensation information about an image to be reproduced is stored in the local storage unit 170. Using image identification information included in the compensation information so as to identify the 2D image, the compensation information processing unit 160 may determine whether the compensation information about the identified 2D image is stored in the local storage unit 170.

The compensation information may include title identification information identifying a title including the 2D image, disc identification information identifying a disc having the title recorded thereon, and/or user identification information for determining which user is related to the compensation information when a plurality pieces of compensation information are stored with respect to a plurality of users.

If the local storage unit 170 contains the compensation information about the image to be reproduced, then in operations 510 and 520 the compensation information processing unit 160 extracts the compensation information, and determines whether the extracted compensation information includes a depth compensation value based on identification information indicating whether the compensation information includes the depth compensation value or a depth value that is compensated for based on the depth compensation value.

If the compensation information includes the depth compensation value, the compensation information processing unit 160 delivers the depth compensation value to the depth map generating unit 140. The depth map generating unit 140 compensates for a depth value to be applied to a pixel of the 2D image based on the depth compensation value, and transmits a depth map having the compensated depth value to the 3D image generating unit 150 in operation 530. The depth map generating unit 140 may increase or decrease depth values of all pixels of the 2D image according to a similar percentage value so as to compensate for the depth value. The depth map generating unit 140 may also adjust a range, which is of the depth value to be applied to the pixel of the 2D image, to be different from a range of an original depth value. For example, where depth values applicable to the pixels of the 2D image are between N and M (where N<M and N and M are integers), the depth map generating unit 140 may adjust a depth value range of the pixels in such a manner that the pixels of the 2D image may have depth values in a predetermined range that is higher than the N value and lower than the M value.

The 3D image generating unit 150 obtains positions in a left-eye image and a right-eye image based on the compensated depth value in operation 540, wherein the pixel of the 2D image is mapped to the positions.

If the compensation information does not include the depth compensation value, the compensation information processing unit 160 determines whether the compensation information includes the compensated depth value in operation 550. If the compensation information includes the compensated depth value, then in operation 560 the compensation information processing unit 160 obtains the positions in the left-eye image and the right-eye image based on the compensated depth value, wherein the pixel of the 2D image is mapped to the positions.

The compensation information processing unit 160 generates the left-eye image and the right-eye image including the positions to which the pixel is mapped in operation 570.

The compensation information may include compensation values respectively for a plurality of objects and backgrounds included in the 2D image. In this case, the depth map generating unit 140 may separately compensate for depth values for the objects and the backgrounds of the 2D image, and may transmit a depth map including the compensated depth values to the 3D image generating unit 150.

In this manner, after a user inputs the compensation information, the user may view a 3D image having a compensated depth. Thus, the user does not have to go through the inconvenience of re-inputting the compensation information whenever he or she views the image.

The image processing method and apparatus according to aspects of the present invention may adjust a depth of a 3D image according to a user selection, may store information about the user selection or the adjusted depth, and thus may generate a 3D image having a same depth at a later time.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image processing method comprising:
   extracting compensation information comprising a depth compensation value or a depth value compensated for based on the depth compensation value;
   when the compensation information comprises the depth compensation value, compensating for a depth value to be applied to a pixel of a 2D (two-dimensional) image based on the depth compensation value, and generating a depth map about the 2D image based on the compensated depth value, and
   when the compensation information comprises the compensated depth value, generating the depth map about the 2D image based on the compensated depth value;
   obtaining positions in a left-eye image and a right-eye image based on the depth map, wherein the pixel of the 2D image is mapped to the positions; and
   generating the left-eye image and the right-eye image in which the pixels are mapped to the obtained positions, the obtained positions being horizontally distant from the original positions in the 2D image,
   wherein the compensation information is provided for each user or each title.

2. The image processing method of claim 1, wherein the compensation information comprises image identification information identifying the 2D image.

3. The image processing method of claim 1, wherein the compensation information comprises compensation value identification information indicating whether the compensation information includes the depth compensation value or the depth value compensated for based on the depth compensation value.

4. The image processing method of claim 2, wherein the compensation information further comprises at least one of title identification information identifying a title comprising the 2D image, disc identification information identifying a disc having the title recorded thereon, and user identification information for determining which of a plurality of users is related to the compensation information.

5. The image processing method of claim 2, wherein the compensation information comprises depth compensation values or depth values compensated for based on the depth compensation values which are respectively for a plurality of objects and backgrounds included in the 2D image.

6. The image processing method of claim 4, wherein the compensating for the depth value to be applied to the pixel of a 2D image based on the depth compensation value comprises increasing or decreasing depth values of pixels of the 2D image according to the same percentage value.

7. The image processing method of claim 4, wherein:
   the depth value to be applied to the pixel of the 2D image is in a range between an N and M value, where N<M and N and M are integers, and
   the compensating for the depth value to be applied to the pixel of the 2D image based on the depth compensation value comprises increasing the value of N or decreasing the value of M, thereby allowing the pixels of the 2D image to respectively have a depth value from among depth values in the adjusted range.

8. An image processing method comprising:
   extracting compensation information comprising a position compensation value or a position value compensated for based on the position compensation value; and
   when the compensation information comprises the position compensation value, compensating for positions in a left-eye image and a right-eye image based on the position compensation value indicating a value for adjusting positions in the left eye image and the right-eye image, wherein the positions are obtained based on a depth map about a 2D image and wherein a pixel of the 2D image is mapped to the positions, and generating the left-eye image and the right-eye image comprising the compensated positions to which the pixel is mapped, the compensated positions being horizontally distant from the original positions in the 2D image and
   when the compensation information comprises the compensated position value, mapping the pixel to positions in the left-eye image and the right-eye image so as to generate the left-eye image and the right-eye image, wherein the positions are obtained based on the compensated position value and wherein the pixel of the 2D image is mapped to the positions,
   wherein the compensation information is provided for each user or each title.

9. The image processing method of claim 8, wherein the compensation information comprises image identification information identifying the 2D image.

10. The image processing method of claim 8, wherein the compensation information comprises identification information indicating whether the compensation information comprises the position compensation value or a position value compensated for based on the position compensation value.

11. The image processing method of claim 10, wherein the compensation information further comprises at least one of title identification information identifying a title comprising the 2D image, disc identification information identifying a disc having the title recorded thereon, and user identification information for determining which of a plurality of users is related to the compensation information.

12. The image processing method of claim 10, wherein the compensation information comprises position compensation values or position values compensated for based on the position compensation values which are respectively for a plurality of objects and backgrounds included in the 2D image.

13. The image processing method of claim 12, wherein the compensating for the positions based on the position compensation value comprises increasing or decreasing position values of pixels of the 2D image according to the same percentage value, wherein the pixels are respectively mapped to the position values.

14. The image processing method of claim 12, wherein:
   the position value to be mapped to the pixel of the 2D image is in a range between N and M value, where N<M and N and M are integers, and
   the compensating for the positions based on the position compensation value comprises increasing the value of N or decreasing the value of M, thereby allowing the position values to respectively have a value from among position values in the adjusted range, wherein the pixels of the 2D image are respectively mapped to the position values.

15. An image processing method comprising:
   compensating for a depth value to be applied to a pixel of a 2D image based on a depth compensation value received from a user;
   generating a depth map about the 2D image based on the compensated depth value, and obtaining positions in a left-eye image and a right-eye image based on the depth map, wherein the pixel of the 2D image is mapped to the positions, the obtained positions being horizontally distant from the original positions in the 2D image;
   generating the left-eye image and the right-eye image comprising the positions to which the pixel is mapped; and generating compensation information comprising the depth compensation value or the compensated depth value, and storing the compensation information wherein the compensation information is provided for each user or each title.

16. The image processing method of claim 15, wherein the compensation information comprises image identification information identifying the 2D image, title identification information identifying a title comprising the 2D image, disc identification information identifying a disc having the title recorded thereon, and user identification information for determining which of a plurality of users is related to the compensation information.

17. An image processing method, comprising:
   obtaining positions in a left-eye image and a right-eye image based on a depth value to be applied to a pixel of a 2D image, wherein the pixel is mapped to the positions;
   adjusting the positions according to a position compensation value received from a user, the adjusted positions being horizontally distant from the original positions in the 2D image;
   generating the left-eye image and the right-eye image comprising the adjusted positions to which the pixel is mapped; and
   generating compensation information comprising the position compensation value or the adjusted positions, and storing the compensation information,
   wherein the compensation information is generated for each user or each title.

18. The image processing method of claim 17, wherein the compensation information further comprises at least one of image identification information identifying the 2D image, title identification information identifying a title comprising the 2D image, disc identification information identifying a disc having the title recorded thereon, and user identification information for determining which of a plurality of users is related to the compensation information.

19. An image processing apparatus, comprising:
   a compensation information processing unit to extract compensation information comprising a depth compensation value or a depth value compensated for based on the depth compensation value;
   a depth map generating unit to compensate for a depth value to be applied to a pixel of a 2D image based on the depth compensation value when the compensation information comprises the depth compensation value, and to generate a depth map about the 2D image based on the compensated depth value, and to generate the depth map about the 2D image based on the compensated depth value when the compensation information comprises the compensated depth value; and
   a three-dimensional (3D) image generating unit to obtain positions in a left-eye image and a right-eye image based on the depth map, wherein the pixel of the 2D image is mapped to the positions, and to generate the left-eye image and the right-eye image comprising the positions to which the pixel is mapped, the obtained positions being horizontally distant from the original positions in the 2D image,
   wherein the compensation information is provided for each user or each title.

20. The image processing apparatus of claim 19, wherein the compensation information comprises image identification information identifying the 2D image.

21. The image processing apparatus of claim 19, wherein the compensation information comprises identification information indicating whether the compensation information comprises the depth compensation value or the depth value compensated for based on the depth compensation value.

22. The image processing apparatus of claim 20, wherein the compensation information further comprises at least one of title identification information identifying a title comprising the 2D image, disc identification information identifying a disc having the title recorded thereon, and user identification information for determining which of a plurality of users is related to the compensation information.

23. The image processing apparatus of claim 20, wherein the compensation information comprises depth compensation values or depth values compensated for based on the depth compensation values which are respectively for a plurality of objects and backgrounds comprised in the 2D image.

24. The image processing apparatus of claim 22, wherein the compensation information processing unit compensates for the depth value by increasing or decreasing depth values of pixels of the 2D image according to a same percentage value by using the depth compensation value.

25. The image processing apparatus of claim 22, wherein:
   the depth value to be applied to the pixel of the 2D image is in a range between N and M value, where N<M and N and M are integers, and
   wherein the compensation information processing unit increases the value of N or and/or decreases the value of M, thereby allowing the pixels of the 2D image to respectively have a depth value from among depth values in the adjusted range.

26. An image processing apparatus, comprising:
   a compensation information processing unit to extract compensation information comprising one from among a position compensation value and a position value compensated for based on the position compensation value; and
   a 3D image generating unit, when the compensation information comprises the position compensation value, to compensate for positions in a left-eye image and a right-eye image based on the position compensation value indicating a value for adjusting positions in the left-eye image and the right-eye image the positions being obtained based on a depth map about a 2D image and a pixel of the 2D image being mapped to the obtained positions based on the depth map, and to generate the left-eye image and the right-eye image comprising the compensated positions to which the pixel is mapped, the compensated positions being horizontally distant from the original positions in the 2D image,
   and, when the compensation information comprises the compensated position value, to generate the left-eye image and the right-eye image by mapping the pixel to positions in the left-eye image and the right-eye image the positions being obtained based on the compensated position value and the pixel of the 2D image being mapped to the obtained positions based on the compensated position value,
   wherein the compensation information is provided for each user or each title.

27. The image processing apparatus of claim 26, wherein the compensation information comprises image identification information identifying the 2D image.

28. The image processing apparatus of claim 26, wherein the compensation information comprises identification information indicating whether the compensation information comprises the position compensation value or a position value compensated for based on the position compensation value.

29. The image processing apparatus of claim 28, wherein the compensation information further comprises at least one of title identification information identifying a title comprising the 2D image, disc identification information identifying a disc having the title recorded thereon, and user identification information for determining which of a plurality of users is related to the compensation information.

30. The image processing apparatus of claim 28, wherein the compensation information comprises position compensation values or position values compensated for based on the position compensation values for each of a plurality of objects and backgrounds comprised in the 2D image.

31. The image processing apparatus of claim 30, wherein the compensation information processing unit increases or decreases position values of pixels of the 2D image according to a same percentage value based on the position compensation value, wherein the pixels are respectively mapped to the position values, and thus adjusts positions in a left-eye image and a right-eye image, wherein the pixel of the 2D image is mapped to the positions.

32. The image processing apparatus of claim 30, wherein:
the position value to be mapped to the pixel of the 2D image is in a range between N and M value, where N<M and N and M are integers, and
the compensation information processing unit increases the value of N or decreases the value of M, and thus allows the position values to respectively have a value from among position values in the adjusted range, wherein the pixels of the 2D image are respectively mapped to the position values.

33. An image processing apparatus, comprising:
a user interface to receive a depth compensation value from a user;
a depth map generating unit to compensate for a depth value to be applied to a pixel of a 2D image based on the depth compensation value, and to generate a depth map about the 2D image based on the compensated depth value;
a 3D image generating unit to obtain positions in a left-eye image and a right-eye image based on the depth map, and to map the pixel of the 2D image to the positions, and to generate the left-eye image and the right-eye image comprising the positions to which the pixel is mapped, the obtained positions being horizontally distant from the original positions in the 2D image; and
a compensation information processing unit to generate compensation information comprising the depth compensation value and/or the compensated depth value, and to store the compensation information in a local storage unit
wherein the compensation information is provided for each user or each title.

34. The image processing apparatus of claim 33, wherein the compensation information further comprises at least one of image identification information identifying the 2D image, title identification information identifying a title comprising the 2D image, disc identification information identifying a disc having the title recorded thereon, and/or user identification information for determining which of a plurality of users is related to the compensation information.

35. An image processing apparatus, comprising:
a user interface to receive a position compensation value from a user;
a 3D image generating unit to obtain positions in a left-eye image and a right-eye image based on a depth value to be applied to a pixel of a 2D image, to map the pixel to the positions, to adjust the positions according to the position compensation value indicating a value for adjusting positions in the left-eye image and the right-eye image, and to generate the left-eye image and the right-eye image comprising the adjusted positions to which the pixel is mapped, the adjusted positions being horizontally distant from the original positions in the 2D image; and
a compensation information processing unit to generate compensation information comprising the position compensation value or the adjusted positions, and to store the compensation information,
wherein the compensation information is generated for each user or each title.

36. The image processing apparatus of claim 35, wherein the compensation information further comprises at least one of image identification information identifying the 2D image, title identification information identifying a title comprising the 2D image, disc identification information identifying a disc having the title recorded thereon, and user identification information for determining which of a plurality of users is related to the compensation information.

* * * * *